(No Model.)
T. B. FOGARTY.
PROCESS OF MAKING AMMONIA.
No. 417,777.  Patented Dec. 24, 1889.
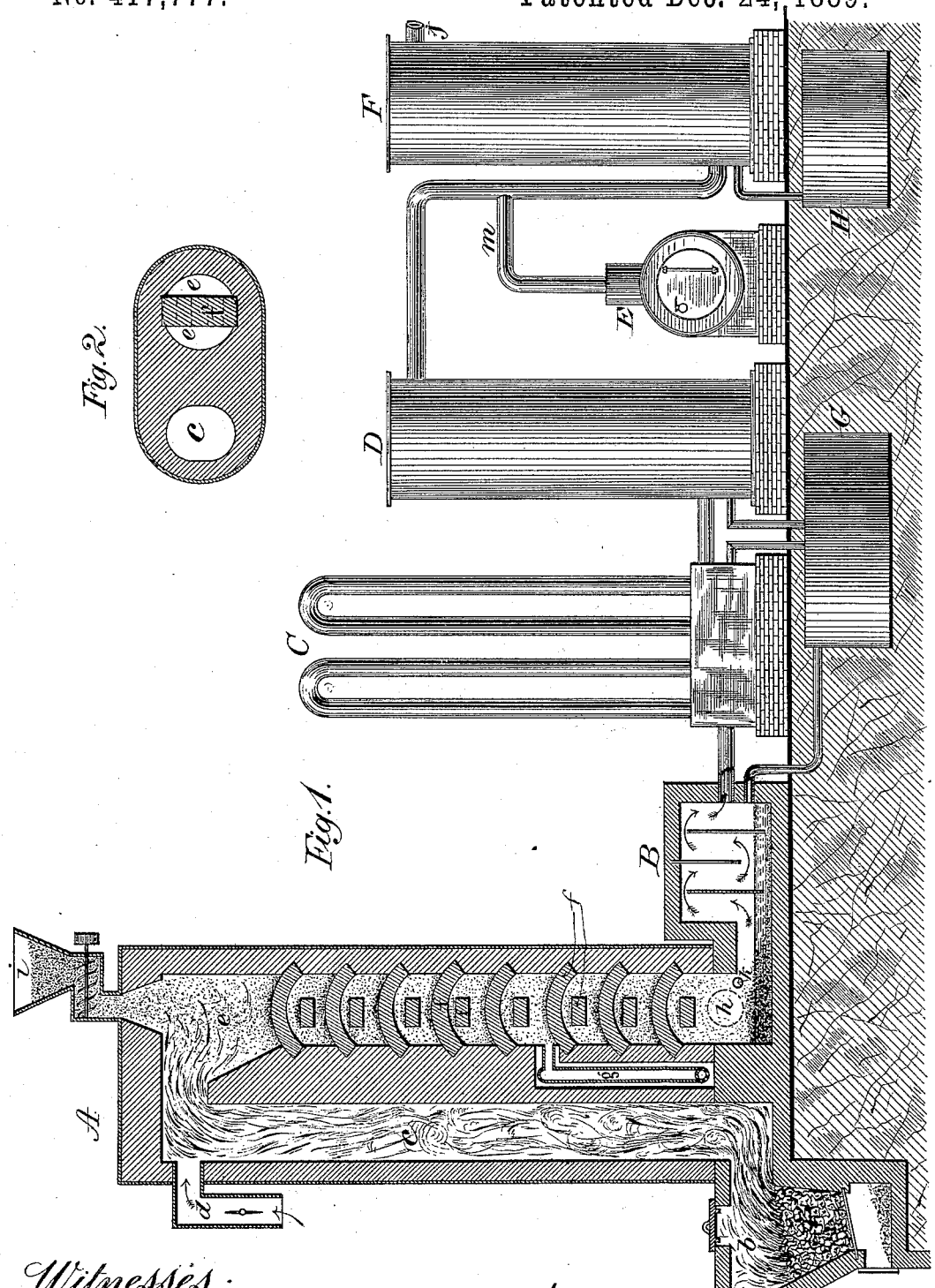
Witnesses:
R. Doolittle
Leo Von Rosenberg
Inventor:
T. B. Fogarty

UNITED STATES PATENT OFFICE.

THOMAS B. FOGARTY, OF LONG ISLAND CITY, NEW YORK, ASSIGNOR TO THE AMERICAN AMMONIA MANUFACTURING COMPANY, OF VIRGINIA.

PROCESS OF MAKING AMMONIA.

SPECIFICATION forming part of Letters Patent No. 417,777, dated December 24, 1889.

Application filed August 6, 1888. Serial No. 282,048. (No specimens.)

*To all whom it may concern:*

Be it known that I, THOMAS B. FOGARTY, of Long Island City, county of Queens, and State of New York, have invented a new and useful Process of Manufacturing Ammonia; and I hereby declare the following to be a full, clear, and exact specification of the same, reference being had to the accompanying drawings, forming a part of this specification.

The object of my invention is to obtain ammonia by a simple and economical process from atmospheric nitrogen and the hydrogen of decomposed steam; and it consists in the matter hereinafter described and pointed out.

In the accompanying drawings, which illustrate an apparatus adapted to carry out the present process, Figure 1 is in part a vertical section and in part an elevation of the apparatus, and Fig. 2 is a horizontal section of the furnace.

This furnace A, as shown in Fig. 1, may be used for the combustion of solid, liquid, or gaseous fuel, and consists of the fire-place $b$, shown partly filled with coal, the upcast or vertical flue $c$, provided with an air-inlet $d$, and the ammonia-generator proper $e$, with suitable shelves or bafflers $f$, and with the steam-superheater $g$ and an outlet $h$, connected with a chimney or aspirator. (Not shown on the drawings.)

B is a dust catcher or collector, by means of which the solid matter escaping from A becomes separated from the gaseous product, and C a condenser wherein the gas is cooled preparatory to the separation from it of the ammoniacal and other alkaline matter which it contains.

D is a scrubber, by means of which the alkaline matter other than ammonia is intercepted and collected.

E is a boiler, by means of which any ammonia caught in C and D may be separated from the other alkaline matter, and F a scrubber for collecting the ammonia.

G and H are tanks or receptacles for the liquor collected from the condenser and scrubbers.

The mode of operation is as follows: I build a fire in the fire-place $b$, when, by means of a suitable chimney or aspirator or blower, or combination of such, I suck, draw, or force air alone or air and steam through the incandescent fuel. I find it advantageous to limit, by means of a damper or other suitable apparatus, the quantity or volume of air admitted to $b$, so that the gaseous products of the combustion taking place therein shall be preferably producer gases, which will pass upward through the upcast or vertical flue $c$, and at the top or some other suitable point thereof will receive an additional supply of air through the pipe $d$, and will thus enter the ammonia-generator proper $e$ in a state of intense combustion, and, passing downward through $e$, will escape at its outlet $h$, through which they will be drawn by a suitable chimney, aspirator, or exhauster. It is evident that the interior of $e$ will after a time become intensely heated, and that the gases escaping at $h$, if the air-supply be properly adjusted, will be truly the waste products of combustion, and that the fuel consumed will thus serve the double purpose of heating the retort or furnace $e$ and at the same time furnishing highly-incandescent nitrogen for the production of ammonia. It is also evident that in this way there will be a great economy of fuel, that at the same time a most intense heat can be maintained in $e$, and that the formation of cyanides will be thereby facilitated and promoted to a most extraordinary degree. It must be evident, too, that as the gaseous products of combustion entering $e$ will contain about nine tons of nitrogen for every ton of coal, or its equivalent of other fuel consumed, this process affords the opportunity of treating enormous volumes of this gas with extreme rapidity, and that, consequently, the product of such a furnace must be extremely large. It is also plain that when oil or gas, natural or manufactured, is the fuel used the fire-place $b$ and the upcast or vertical flue $c$ may be dispensed with, and that these substances may be advantageously burned in the top of the ammonia-generator $e$ itself or in a suitable combustion-chamber formed therein. Having brought my ammonia-generator to a working heat, and having closed its outlet $h$, I now, by means of a suitable chimney, pump, jet, or aspirator, pump, suck, or draw the entire products of combustion through the whole train of apparatus shown in Fig. 1 and cause them to escape through the outlet $j$ of the scrubber F. At the same time I discharge into the bottom of the ammonia-generator, through the pipe $k$ or its equivalent, a volume of steam, which will serve to partly cool the incandescent gases, and at the same time will help to settle the dust and other solid matter suspended in the gases passing through the dust-catcher B. I also inject or cause to pass into $e$, through the superheater $g$, a suitably-adjusted volume of steam, which serves the double purpose of decomposing the cyanides formed in the upper part of $e$, with the production of ammonia, fuel-gas, and alkali, and of at the same time furnishing a gaseous envelope for the protection of the ammonia produced from contact with the heated walls of the furnace or generator, and also a cooling medium, whereby the intense and otherwise destructive heat of the incandescent gases may be moderated. While ordinary live steam will suffice for this purpose, it is most desirable to superheat the steam before admitting it into $e$, as by this means a larger volume of steam may be used without lowering the temperature of $e$ and of the contained gases to a degree insufficient for the rapid decomposition of the cyanides. I now start my feeder $i$, and by means thereof feed a suitably-adjusted quantity of pulverized carbon and alkali into the ammonia-generator $e$, through which its fall or passage is retarded by the shelves or bafflers $f$, and in which the alkalized carbon soon becomes intensely heated, and, by contact with the incandescent nitrogenous gas passing through $e$, immediately combines with the nitrogen thereof to form alkaline cyanides, which are in turn decomposed by the steam admitted through the superheater $g$, with the production of ammonia, fuel-gases, and alkali, this last chiefly in a state of combination. From the ammonia-generator $e$ my gaseous products mixed with suspended solid matter, and moreover highly charged with ammoniacal and other alkaline gases and vapors, pass into the dust-catcher B, where they meet with a jet of steam, which is admitted through the pipe $k$, and thereby they have their temperature greatly reduced, and are moreover caused to deposit the solid matter which they hold in suspension. A portion of the ammoniacal and other alkaline gases and vapors present in the gas is also collected in B and forms, with the condensed steam, a strong alkaline liquor, which is collected in the tank G. From B the gas, still highly charged with ammoniacal and other alkaline gases and vapors, passes to the condenser C, where it is cooled sufficiently to admit of its being advantageously introduced into the scrubber D, through which it passes slowly, and wherein it becomes thoroughly broken up, and is moreover subjected to cooling influences and to the contact of cool wet surfaces, with the result that it is freed from still another portion of its ammonia and from the remainder of the dissolved and suspended alkali. This scrubber D represents a scrubber or series of scrubbers used at this point of the process for separating from the ammonia such other soluble alkaline salts as may be present in the ammoniacal liquor, for by repeated scrubbing, using the same liquor over and over again, I obtain a highly-concentrated solution of these salts accompanied by a little ammonia. By transferring this solution to the boiler E and heating it to 212° Fahrenheit the ammonia present will be driven off through the pipe $m$ and will be carried to join the volume of gas entering the scrubber F, which in turn represents a scrubber or series of scrubbers, wherein the ammoniacal liquor is collected and concentrated as in ordinary gas-works. From D the gas now passes to the scrubber F, where it is entirely freed from its remaining ammonia, which is dissolved in the water of the tank H, whence it may be collected as a strong ammoniacal liquor capable of being treated and reduced to a commercial form by any of the usual processes. The alkaline liquor collected in the tank G will be found to contain a good deal of ammonia, which may be readily separated from the other alkaline matter contained in this tank by causing the liquor to pass slowly through the boiler E, which is kept heated to about a boiling temperature, the result being that the ammonia present is entirely expelled as free or caustic ammonia, and in this form escapes through the pipe $m$ into the scrubber F, where it is absorbed and collected, as already described.

Be it understood that I do not bind or confine myself to the exact process or succession of processes or to the precise form, construction, or connection of the apparatus described, for it must be evident that these may be varied indefinitely.

Be it also understood that by the term "actively-incandescent nitrogenous furnace-gases" I mean the gases produced by the combination of a combustible with the oxygen of air or of air and steam mixed and still in the state of intense incandescence produced by such combustion.

In no prior process has a mixture of carbon and an alkali been heated by burning gases moving in the same direction therewith to produce cyanogen or cyanides, and in none has steam been introduced and mingled with such mixture of carbon and alkali after it has been subjected to the action of burning gases and then caused to move in the same direction and in intimate mixture therewith.

In application Serial No. 283,482, filed August 22, 1888, I have described this process and have made claim to it when limited to a step whereby air in excess is introduced for the special purpose of converting cyanides into cyanates; but said process I desire to claim herein without said limitation.

According to methods heretofore patented to me, furnace-gases have been passed upwardly through a falling mixture of carbon and alkali and steam admitted above (or subsequently) to decompose the cyanogen sought to be produced by the prior operation, and in one case this steam was passed downwardly with the gaseous products of the first steps of the process. In another method the final products of combustion were passed up through a stationary mass of carbon and alkali, and yet in others air, gas, and steam, or gas and steam, were simultaneously introduced and passed downwardly with falling carbon and alkali. In the latter cases water-gas was produced and the desired production of cyanides thereby hindered.

In the cases above mentioned, in which gases or gaseous products were passed upwardly through the solids, the outlets were liable to be obstructed by fine material carried out of the furnace whenever any considerable amount of gases and steam (or sufficient to produce results on a commercial scale) were forced through the carbon and alkali, and, further, two distinct supplies of steam (or the equivalent) at separate points in the furnace were required to effect decompositions which are accomplished by a single steam-supply in the present instance, and in none was a degree of heat secured sufficient for the best results.

By the present improvement air and gas are introduced and the latter burned in the presence of the moving solids employed, thus heating them and the furnace more directly and more highly than practicable by the use of final products generated outside of the furnace or by the use of superheated gases, and, further, all extraneous steam or all steam except such inconsiderable portion as may be generated from the moisture in the solids is excluded until after the production of cyanides has been effected and air is introduced in excess to convert the cyanides into cyanates. The same steam-supply decomposes both the gaseous products of the prior steps of the operation and the solid cyanides, and this steam, as well as the air and gases, moves in the same direction and intermingles with the solids to secure intimate contact and to afford time for the required reactions.

What I claim, and desire to secure by Letters Patent, is—

1. The process herein described of producing ammonia, consisting in first introducing incandescent gases and air to burn said gases into the presence of a moving mixture of pulverized carbon and alkali, then conducting these fluids and solids together in the same direction, thereby affording time for heating the solids and effecting desired reactions and producing alkaline cyanides and cyanates, and subsequently introducing steam to decompose these alkaline compounds, and producing ammonia and other products, substantially as described.

2. In the process of making ammonia, the steps consisting in first introducing incandescent gases and air to burn said gases in the presence of a moving mixture of pulverized carbon and alkali, then conducting these fluids and solids together in the same direction, thereby affording time for heating the solids and effecting desired reaction, substantially as described.

3. In the process of making ammonia, the steps which consist in introducing steam into the presence of cyanides and other solid and gaseous substances produced by incandescent gases acting upon mingled carbon and alkali, and conducting these several fluid and solid substances in the same direction in an intermingled state to decompose the cyanides and cyanates, substantially as described.

4. In a process of producing ammonia, the steps which consist in causing the nitrogen of incandescent nitrogenous furnace-gases to combine with carbon and alkali and to produce alkaline cyanides and cyanates by passing burning gases in the same direction with said solids, and in subsequently decomposing the cyanides and cyanates so produced by steam, producing ammonia, fuel-gases, and alkali, scrubbing the gases thus produced, and separating the ammonia from the dissolved alkalies and salts by heat, substantially as described.

In testimony whereof I have signed my name to this specification before two subscribing witnesses.

THOS. B. FOGARTY.

Witnesses:
R. DOOLITTLE,
LEO VON ROSENBERG.